United States Patent [19]  
Pesente

[11] Patent Number: 5,012,727  
[45] Date of Patent: May 7, 1991

[54] APPARATUS FOR THE CONTROL OF A PASTEURIZING PROCESS

[75] Inventor: Narciso Pesente, Verona, Italy

[73] Assignee: Enomec S.p.A., Verona, Italy

[21] Appl. No.: 617,744

[22] Filed: Nov. 26, 1990

[30] Foreign Application Priority Data

Nov. 27, 1989 [IT] Italy ................. 85000 A/89

[51] Int. Cl.$^5$ ............... A23B 7/00; A23L 3/00; A61L 2/04; B65B 55/00
[52] U.S. Cl. ................. 99/470; 99/275; 99/277.1; 99/362; 99/453; 99/483; 422/26; 422/304
[58] Field of Search .......... 99/275, 276, 277.1, 99/355, 361, 362, 369, 452, 453, 467, 468, 470, 477–479, 483; 422/302, 304, 26; 426/407, 412, 521

[56] References Cited

U.S. PATENT DOCUMENTS

| 3,559,563 | 2/1971 | Brenner | 99/275 |
| 3,622,357 | 11/1971 | Tillman | 99/362 |
| 3,972,679 | 8/1976 | Ruig | 426/412 |
| 4,164,590 | 8/1979 | Mencacci | 99/359 X |
| 4,331,629 | 5/1982 | Huling | 422/304 X |
| 4,441,406 | 4/1984 | Becker et al. | 99/275 |
| 4,704,958 | 11/1987 | Braymand | 422/304 X |
| 4,773,321 | 9/1988 | Wijts | 99/483 |
| 4,796,523 | 1/1989 | Mette | 99/470 |

Primary Examiner—Timothy F. Simone  
Attorney, Agent, or Firm—Browdy and Neimark

[57] ABSTRACT

The invention relates to an apparatus for the control of a pasteurizing process, designed to be applied to the middle area of a pasteurizer, located downstream of a heating area from which bottles (1) of product carried by a conveyor (2) come, and upstream of a bottle cooling area. In said middle area of the pasteurizer, provision is made for four tanks (7, 8, 9, 10) containing water at differentiated temperatures which feed an equal number of sprayers (3, 4, 5, 6) located above the bottles (1) in movement. The two middle tanks (8, 9) are each divided into two chambers (12, 13; 24, 25) separated by an upright partition (11; 23). In the event that the conveyor (2) should undergo an emergency stop, the bottles (1) that at the moment are in the area having the highest temperature are automatically sprayed with water at a lower temperature coming from the corresponding tanks whereas the high temperature is maintained in the tanks having the highest temperature until the emergency state is over. For the purpose pipelines (15, 21, 27, 33) are provided which suitably connect the various tanks (7, 8, 9, 10) to one another and to the sprayers (3, 4, 5, 6) located above the bottles (1).

2 Claims, 1 Drawing Sheet

APPARATUS FOR THE CONTROL OF A PASTEURIZING PROCESS

BACKGROUND OF THE INVENTION

1. Field of the Invention

The present invention relates to an apparatus for the control of a pasteurizing process.

In greater detail, such an apparatus checks the temperature to which the product to be pasteurized is subjected during the emergency stop periods of the conveyor inside a pasteurizer so that the product is not impaired.

The concerned apparatus is designed to be applied to the middle area of a pasteurizer where the real pasteurizing process occurs, said process being particularly connected with the treatment of beer contained in bottles or cans.

2. Prior Art

It is known that said middle area in the pasteurizer is located downstream of a heating area where temperature becomes increasingly higher and upstream of a subsequent cooling area. The bottled product is carried through the various areas of the pasteurizer having different temperatures by means of a conveyor provided with a feed motion. The temperature of the bottled product is modified by spraying water coming from a series of sprayers onto the bottles arranged on the conveyor. Said sprayers are fed from pipelines drawing the water from the tanks located underneath the conveyor and in which the water temperature is kept within predetermined values by suitable heating means.

It is known that in case of an emergency stop of the conveyor (due for example to the occurence of a critical situation downstream), the temperature of the water sprayed onto the bottles in the pasteurizer's middle area (where said temperature reaches the highest values) must be lowered in order to avoid the bottled product being damaged. Practically the temperature must become lower than the pasteurization temperature which is slightly higher than 60° C., and must be held underneath the above value as far as the emergency period goes on.

Presently, in accordance with the known art, the temperature decrease is carried out by introducing cold water coming from the waterworks into the tanks feeding the sprayers while hot water is at the same time evacuated, for well-apparent balancing purposes.

The above operation involves a two fold drawback, namely there is a water waste and energy is lost in the form of hot water.

SUMMARY OF THE INVENTION

The main object of the present invention is to eliminate the above drawback by providing an apparatus for the temperature control during the emergency periods in a pasteurizing apparatus which allows the use of recycle water, so that it is no longer necessary to draw cold water from the waterworks and evacuate hot water which is then thrown away.

The foregoing and further objects are attained by an apparatus for the control of a pasteurizing process, designed to be applied to the middle area of a pasteurizer, located downstream of a heating area from which bottles of product carried by a conveyor come, and upstream of a bottle cooling area, in which middle area provision is made for four tanks containing water at differentiated temperatures which feed an equal number of sprayers located above the bottles in movement, the two middle tanks being each divided into two chambers separated by an upright partition, the first chamber of each group being covered with a sloping shed and being provided with a water recycle pipeline, pipelines equipped with respective pumps being also provided for suitably connecting the various tanks to one another and to the sprayers located above the bottles. In the event that the conveyor should undergo an emergency stop, the bottles that at the moment are in the area having the highest temperature are automatically sprayed with water at a lower temperature coming from the corresponding tanks whereas the high temperature is maintained in the tanks having the highest temperature until the emergency state is over.

BRIEF DESCRIPTION OF THE DRAWING

Further features and advantages of the present invention will become more apparent from the detailed description of a preferred embodiment thereof, given hereinafter by way of non limiting example with reference to the accompanying drawing in which the only FIGURE is a diagram of the apparatus in question located at the middle area of a pasteurizer.

DESCRIPTION OF THE PREFERRED EMBODIMENT

Figure 1:
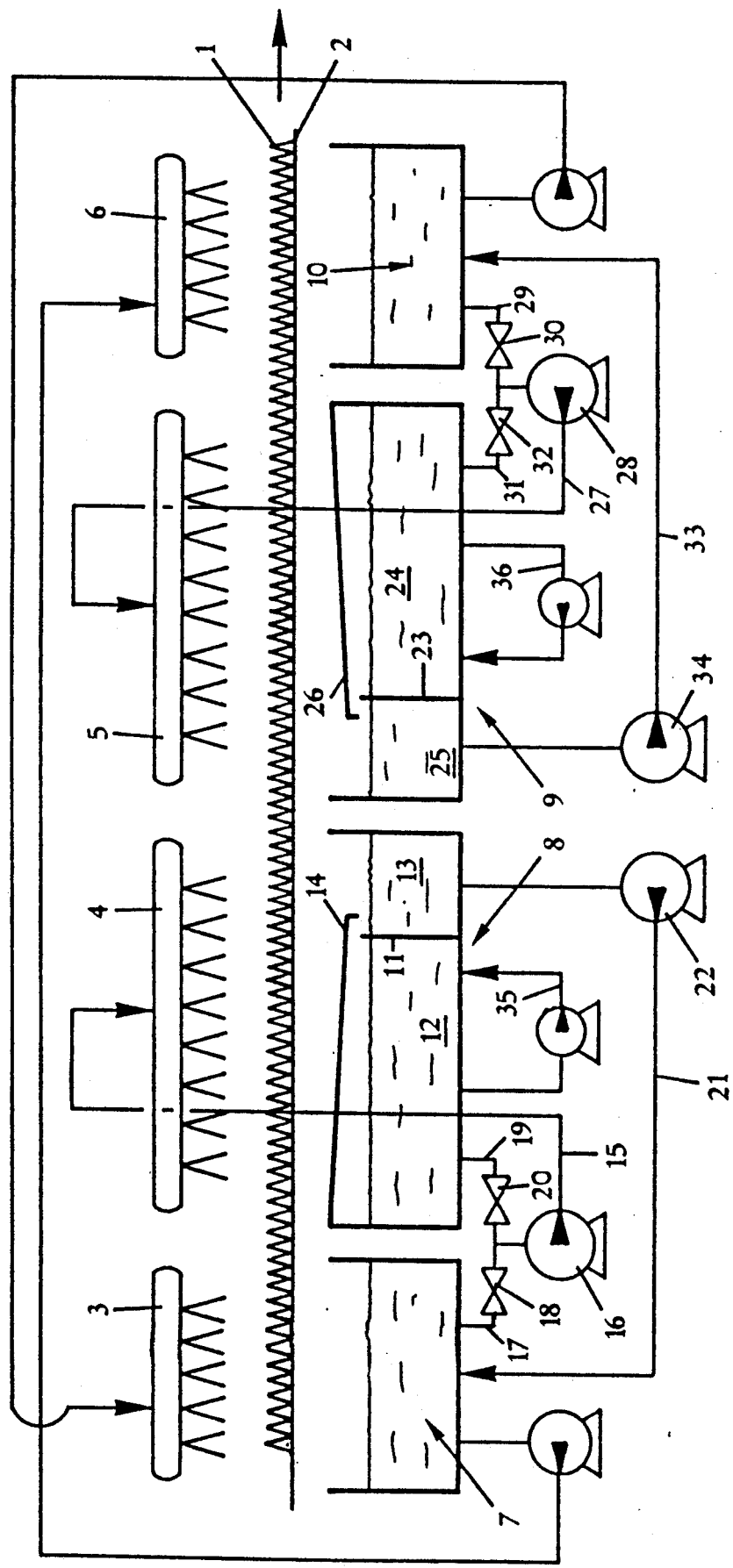

With reference to the drawing, 1 denotes bottles of beer resting on a conveyor 2 provided with a feed motion in the direction of the arrow.

Shown in the FIGURE is the middle area of a pasteurizer at which the true pasteurizing process takes place. Said middle area is located downstream of a heating area (only partly shown) from where bottles 1 come and where temperature becomes increasingly higher, and upstream of a cooling area (only partly shown as well) to which bottles 1 are sent.

Bottles 1 are sprayed with water spouting from first, second, third and fourth sprayers, generally identified by 3, 4, 5 and 6. The water comes from first, second, thrid and fourth tanks, generally identified by 7, 8, 9 and 10 and located downwardly to the conveyor 2.

The first tank 7 containing water at a temperature of about 50° C., feeds the fourth sprayer 6, whereas the fourth tank 10, also containing water at a temperature of about 50° C. feeds the first sprayer 3 for the purpose of recovering heat from the hotter bottles (disposed to the right in the drawings) and transfer it to the colder bottles (disposed to the left in the drawing).

The second tank 8 is divided by an upright partition 11 into one chamber 12 and a second chamber 13. The first chamber 12 contains water at about 65° C. and is covered with a sloping shed 14 adapted to convey the water coming from the second sprayer 4 to the second chamber 13.

Denoted by 15 is a pipeline provided with a pump 16 adapted to send the water contained in the first tank 7 or, as will be best clarified in the following, the water contained in the first chamber 12, to the second sprayer 4. The first pipeline 7 comprises one branch 17 connected to the first tank 7 to which one valve 18 is mounted, and a second branch 19 connected to the first chamber 12 to which a second valve 20 is mounted.

A second pipeline has been shown at 21 and it is provided with a second pump 22 adapted, as more clearly shown below, to send the water contained in the second chamber 13 to the first tank 7.

The third tank 9 is divided by an upright partition 23 into a third chamber 24 and a fourth chamber 25. The third chamber 24 contains water at about 62° C. and is covered with a sloping shed 26 adapted to convey the water coming from the third sprayer 5 to the fourth chamber 25.

27 denotes a third pipeline provided with a third pump 28 adapted to send the water contained in the fourth tank 10 or, as will be best clarified later, the water contained in the third chamber 24, to the third sprayer 5. The third pipeline 27 is comprised of a third branch 29 connected to the fourth tank 10 and to which a third valve 30 is mounted, and a fourth branch 31 connected to the third chamber 24 and to which a fourth valve 32 is mounted.

Identified by 33 is a fourth pipeline provided with a fourth pump 34 adapted, as more clearly described in the following, to send the water contained in the fourth chamber 25 to the fourth tank 10.

Finally 35 and 36 denote two water recycle pipelines associated with the first chamber 12 and third chamber 24, respectively.

Operation of the apparatus according to the invention described above mainly as regards structure, is as follows.

During the normal operating conditions of the pasteurizer (that is in the absence of emergency) the conveyor 52 moves forward according to the direction shown by the arrow.

The first valve 18 is closed whereas the second valve 20 is open. In this way the second sprayer will spray water at about 65° C. onto the bottles 1, which water comes from the first chamber 12 which is provided with appropriate heating means (not shown). The water at about 65° C. coming from the second sprayer 4 will be collected in the second chamber 13 and it will overflow therefrom into the first chamber 12 getting over the partition 11.

Likewise, the third valve 30 is closed whereas the fourth valve 32 is open. In this way the third sprayer 5 will spray water at about 62° C. coming from the third chamber 24 which is provided with suitable heating means (not shown), onto the bottles 1. The water at about 62° C. coming from the third sprayer 5 will be collected in the fourth chamber 25 from where it will overflow to the third chamber 24 passing over the partition 23.

When the pasteurizer is operating in the above normal manner, the second and fourth pumps 22 and 34 are at a standstill so that there is no water flow within the second and fourth pipelines 21 and 33. Likewise water is not flowing in the recycle pipelines 35 and 36.

In case of an emergency stop of the conveyor 2, the first valve 18 will be opened and simultaneously the second valve 20 will be closed. Therefore the water reaching the second sprayer 4 will have a temperature of about 50° C. (water coming from the first tank 7) and not of 65° C. as before. Therefore bottles 1 will be immediately sprayed with water having a lower temperature.

Likewise, the third valve 30 will be opened and simultaneously the fourth valve 32 will be closed. As a result the third sprayer 5 will no longer receive water at a temperatue of about 62° C. but water at about 50° C (coming from the fourth tank 10).

During this emergency period, the second pump 22 will start operating thereby creating a water recycle from the second chamber 13 to the first tank 7. Obviously the water temperature will not be of 50°C. but it will have a value ranging between 50° C. and 65° C., since at the beginning the temperature in the second chamber 13 was equal to 65° C.

Similarly the fourth pump 34 will start operating and it will create a water recycle from the fourth chamber 25 to the fourth tank 10. In this case too the water temperature will not be equal to 50° C. but its value will be in the range of 50° C. to 62° C., due to the fact that at the beginning the temperature in the fourth chamber 25 was equal to 62° C.

All the above water flowing is subjected to the action of thermal probes (not shown) adjusting the temperature by means of standard instruments.

The first and third chambers 12 and 24 during the above steps would remain uncontrolled because no more water is introduced into said chambers. In order to keep the temperature of the water present therein at a constant value of about 65° C. and 62° C., waiting for the end of the emergency period, traditional heating means (not shown) is utilized which is introduced into the two chambers 12 and 24 and meanwhile water is allowed to run through the two recycle pipelines 35 and 36.

It is to be noted that the emergency period can have an indefinite length because the temperature of bottles 1 is always kept under 60° C. and it is known that under this temperature no pasteurization of the product occurs.

On the restoring of the normal operating conditions to which the moving forward of the conveyor 2 corresponds, the temperature of bottles 1 will be equal to about 55° C., that is a lower temperature than the one designed for the pasteurization area. However since in chambers 12 and 24 the operating temperature has been maintained, bottles 1 will be immediately sprayed with water having a temperature of about 65° C. and about 62° C. respectively. Obviously all that can be achieved after restoring the water flow conditions corresponding to the normal working step.

It is to be noted that by the use of the apparatus in question any water waste is eliminated, at the same time being also eliminated the evacuation of hot water.

The invention attains the intended purposes.

Obviously the present invention when practically embodied may also have forms and configurations different from the one herein illustrated without departing from the scope of the intentive idea characterizing it.

In addition all of the details may be replaced by technically equivalent elements and the sizes and materials used can be of any nature depending upon requirements.

What is claimed is:

1. An apparatus for the control of a pasteurizing process designed to be applied to the middle area of a pasteurizer where the pasteurization occurs, said middle area being located downstream of a heating area from which the bottles of product carried by a conveyor provided with a feed motion in a forward direction come, and upstream of a cooling area to which said bottles are sent, provision being made in said middle area for a series of tanks containing water at differentiated temperatures and a series of sprayers fed with water from said tanks located above the sprayers, which sprayers spout water onto the bottles arranged on the conveyor, the first tank in the direction of movement of the conveyor, containing water at a temperature of about 50° C., feeding the last sprayer and the last tank containing water at a temperature of about 50° C. feeding the first sprayer, said apparatus comprising:

- a second tank located downstream of said first tank and divided by an upright partition into one chamber and a second chamber, the firt chamber containing water about 65° C. being covered with a sloping shed adapted to convey the water coming from a second sprayer to the second chamber;
- one pipeline provided with one pump adapted to send the water contained in said first tank at about 50° C. or the water contained in said first chamber at about 65° C. to said second sprayer, said first pipeline comprising one branch connected to said first tank at about 50° C. to which one valve is mounted and a second branch connected to said first chamber at about 65° C. to which a second valve is mounted;
- a second pipeline provided with a second pump adapted to send the water contained in said second chamber to said first tank at about 50° C.;
- a third tank located upstream of said last tank and divided by an upright partition into a third and a fourth chamber, the third chamber containing water at about 62° C. being covered with a sloping shed adapted to convey the water coming from a third sprayer to the fourth chamber;
- a third pipeline provided with a third pump adapted to send the water contained in said last tank at about 50° C. or the water contained in said third chamber at about 62° C. to said third sprayer, said third pipeline comprising a third branch connected to said last tank at about 50° C. to which a third valve is mounted and a fourth branch connected to said third chamber at about 62° C. to which a fourth valve is mounted;
- a fourth pipeline provided with a fourth pump adapted to send the water contained in said fourth chamber to said last tank at about 50° C.

2. The apparatus as claimed in claim 1, wherein said first chamber at about 65° C. and said third chamber at about 62° C. are each provided with a water recycle pipeline.

* * * * *